United States Patent
Allard et al.

(10) Patent No.: US 7,392,119 B2
(45) Date of Patent: Jun. 24, 2008

(54) METHOD AND DEVICE FOR LOCATING THE POSITION, ON THE RIGHT OR ON THE LEFT, OF A WHEEL OF A VEHICLE

(75) Inventors: Pierre-Yves Allard, Fonsorbes (FR); Gilles Dulac, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 142 days.

(21) Appl. No.: 11/293,256

(22) Filed: Dec. 5, 2005

(65) Prior Publication Data

US 2006/0142911 A1 Jun. 29, 2006

(30) Foreign Application Priority Data

Dec. 10, 2004 (FR) .................................. 04 13175

(51) Int. Cl.
G01M 17/00 (2006.01)
G01M 17/02 (2006.01)
G06F 7/00 (2006.01)
G06F 19/00 (2006.01)

(52) U.S. Cl. .......................... 701/29; 340/445; 340/446; 340/447; 340/448

(58) Field of Classification Search ............. 701/29–36, 701/1; 340/445–448
See application file for complete search history.

(56) References Cited

U.S. PATENT DOCUMENTS

2004/0239492 A1   12/2004   Katou

FOREIGN PATENT DOCUMENTS

| EP | 1 481 823 | | 12/2004 |
| GB | 2 344 232 | | 5/2000 |
| GB | 2386427 A | * | 9/2003 |
| WO | WO 2004/048131 | | 6/2004 |

\* cited by examiner

*Primary Examiner*—Khoi H. Tran
*Assistant Examiner*—Jonathan Goldfarb
(74) *Attorney, Agent, or Firm*—Young & Thompson

(57) ABSTRACT

A method and device for locating the position, on the right or on the left, of a vehicle wheel. The wheel is equipped with two magnetic sensors having axes of maximum sensitivity lying in a plane that is secant to the axis of rotation of the wheel and which are offset from one another in this secant plane by a predetermined angle θ. As the vehicle moves in a given travel direction, a signal generated by the variation in a magnetic field is measured at the terminals of each of the magnetic sensors to deliver two periodic signals phase-shifted from one another by an angular value equal to (+ or −) θ, this phase shift is used to determine the direction of wheel rotation, and from such direction and the travel direction, the location, on the right or on the left, of the wheel is deduced.

17 Claims, 1 Drawing Sheet

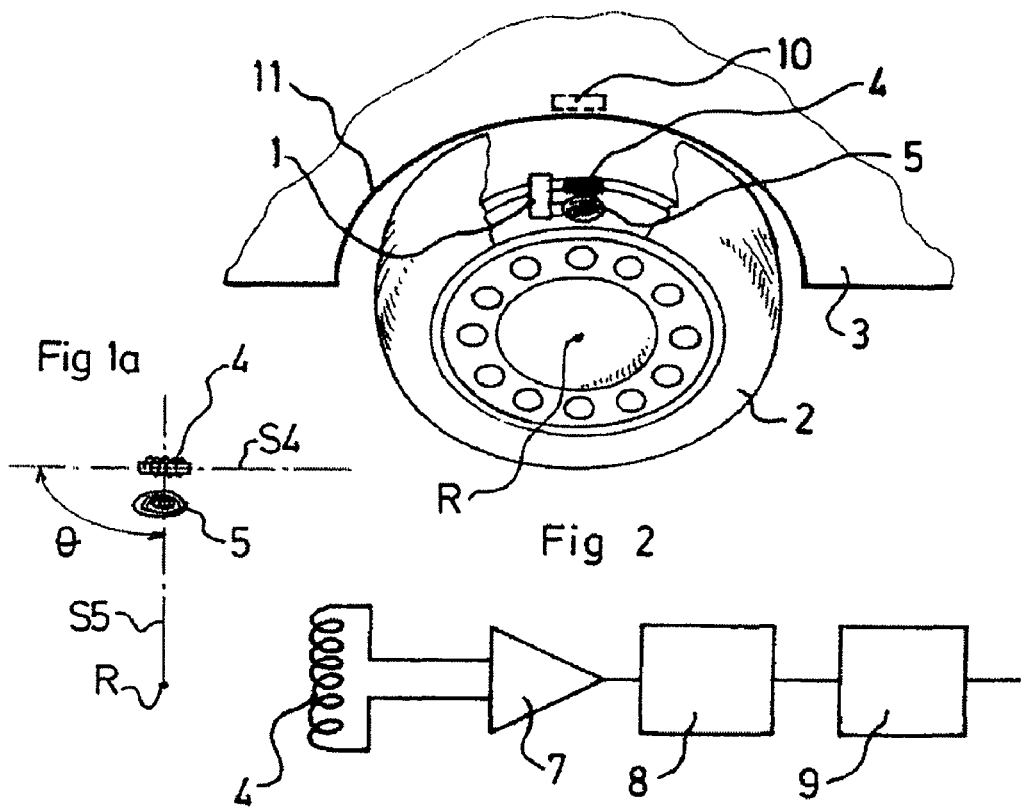
Fig 1
Fig 1a
Fig 2
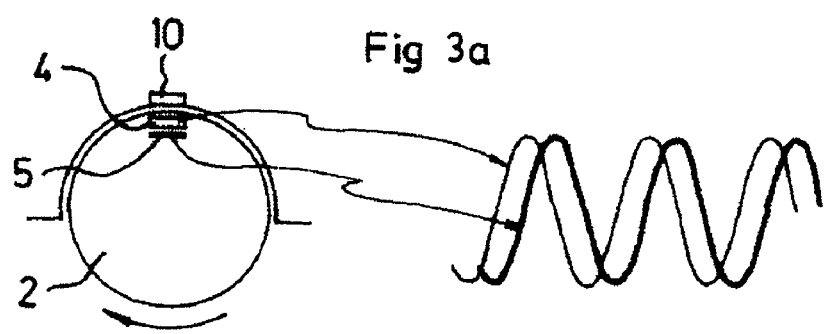
Fig 3a
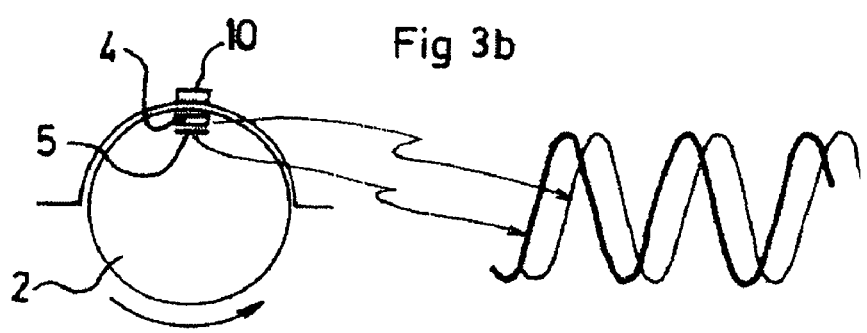
Fig 3b

METHOD AND DEVICE FOR LOCATING THE POSITION, ON THE RIGHT OR ON THE LEFT, OF A WHEEL OF A VEHICLE

BACKGROUND OF THE INVENTION

The invention relates to a method and a device for locating the position of a wheel with respect to the right or on the left side of a vehicle.

DESCRIPTION OF THE RELATED ART

Motor vehicles are increasingly possessing, for safety purposes, monitoring systems comprising sensors mounted on each of the wheels of the vehicle, these sensors being dedicated to measuring parameters, such as the pressures or temperatures of the tires with which these wheels are equipped, and intended to inform the driver of any abnormal variation in the parameter measured.

These monitoring systems are conventionally provided with a sensor mounted on each of the wheels of the vehicle and comprising a microprocessor and a radiofrequency emitter (or RF emitter) and with a central unit for receiving the signals emitted by the emitters, comprising a computer incorporating a radiofrequency receiver (or RF receiver) connected to an antenna.

One of the problems that such monitoring systems need to solve lies in the need to associate with each signal received by the receiver of the central unit, an information item regarding the location of the sensor and therefore of the wheel from which this signal originated, this need persisting throughout the life of the vehicle, that is to say having to be observed even when the wheels have been changed or simply when the position of these wheels has been swapped around.

At the present time, a first location method is to use three low-frequency antennas, each antenna positioned near one of the wheels of the vehicle and to perform a location procedure that consists in successively energizing each of these three antennas by emitting a low-frequency magnetic field. Each of these sensors then (in turn) discloses its identification number to the central unit. The latter associates this identification number with a position on the vehicle (front right, front left, rear right, rear left).

According to this procedure, the sensor mounted on the wheel located near the energized antenna, causes the emission of a low-frequency signal containing an identification code identifying the sensor so that the successive energizing of the three antennas leads to the location of the three sensors mounted on the wheels adjacent to these antennas and, by deduction, leads to the location of the fourth sensor.

The main advantage with such a method lies in the fact that the location procedure is very quick and leads to almost instantaneous location after the vehicle has been started.

By contrast, this solution entails equipping the vehicle with three antennas and all the related requisites: connecting cables, control amplifiers, etc., which means that it proves expensive.

In order to limit the cost required by the location procedure, a second solution currently implemented consists first of all in reducing the number of antennas to two and in positioning these two antennas near the two front wheels, so as to allow the two front wheels to be located, and so as to allow the latter to be differentiated from the two rear wheels.

This second solution also combines with the use of the two antennas, a technique based on a statistical method that consists in comparing the accelerations of the wheels in a curve in order to discriminate between the left wheels and the right wheels.

Because one antenna has been eliminated, this second solution proves, as mentioned above, less expensive than the first solution described. However, this saving is made at the expense of the speed of the location procedure which, in this second solution, proves to be relatively lengthy because a significant amount of running time is required in order to discriminate between left and right locations.

SUMMARY OF THE INVENTION

The present invention is aimed at alleviating the disadvantage associated with the length of the right/left location procedure of the second technique described hereinabove and its main objective is to provide a right/left location procedure that is very efficient in terms of responsiveness and in addition, to implement it, requires hardware the overall cost of sourcing and fitting of which is lower than the overall cost of an antenna.

To this end, the invention is aimed firstly at a method for locating the position, on the right or on the left, of a wheel of a vehicle, whereby:

the wheel is equipped with two magnetic sensors having axes of maximum sensitivity lying in a plane that is intersecting to the axis of rotation of the wheel and which axes are offset from one another, in this plane, by a predetermined angle $\theta$, and as the vehicle moves in a given direction of travel:

a signal generated by the variation in the magnetic field is measured at the terminals of each of the two magnetic sensors so as to deliver two periodic signals phase-shifted with respect to one another by an angular value equal to (+ or −) $\theta$, each one representative of the variations in the values of the magnetic field as detected by the magnetic sensors during one revolution of the wheel, this phase shift is used to determine the direction of rotation of the wheel, and from this direction of rotation and from the direction of travel of the vehicle, the location of the wheel, whether positioned on the right or on the left side of the vehicle, is deduced.

The principle underlying the invention has therefore been to equip each wheel, to be located, with two magnetic sensors arranged in such a way that the signals at the terminals of the sensors are phase shifted from one another and to deduce from this phase shift the direction of rotation and the location of the wheel with respect to being on the right/on the left side of the vehicle.

According to this principle, the invention leads to very quick location of the wheel position, on the right/on the left, which location is in fact obtained after a few revolutions of the wheel. In addition, the overall cost (sourcing and fitting) of two magnetic sensors is lower than that of one antenna.

It should be noted that it is known practice, particularly from international patent application WO2004/048131, to perform right/left location of a wheel by equipping the latter with two accelerometers arranged in such a way that the vertical components of the directions of measurement of the accelerometers are offset by an angular value $\Delta$ and that the signals delivered by these accelerometers are phase shifted by this same value $\Delta$.

Such a method therefore displays certain analogies with the method of the invention because it consists in determining the direction of rotation of the wheel by analyzing the phase shift between the signals delivered by two sensors mounted on the wheel.

However, according to that anterior document, the sensors used consist of accelerometers, that is to say, on the one hand, of sensors that have a high cost price and, on the other hand, of measurement means the results of the measurements of which can be used only when the vehicle is moving along at a speed above a given threshold of the order of 40 km/h.

For its part, the invention consists in using two very low-price sensors, the results of the measurements of which can be used very quickly right from the first few revolutions of the wheel of the vehicle.

In order to obtain two readily discriminatable signals, and according to an advantageous implementation of the invention, the two magnetic sensors are positioned in such a way that their axes of maximum sensitivity lie orthogonal to one another.

To the same end and advantageously according to the invention, the two magnetic sensors are positioned in such a way that their axes of maximum sensitivity lie in a plane orthogonal to the axis of rotation of the wheel.

Furthermore, with a view to increasing the sensitivity of the method according to the invention and advantageously, the cyclic signal representative of the variations in the values of the magnetic field as detected by each magnetic sensor is amplified and shaped in such a way as to obtain a periodic signal of squarewave shape as the vehicle moves along.

With the same view of increasing the sensitivity and therefore the reliability of the method according to the invention, the vehicle is advantageously equipped with a magnet that is fixed with respect to each wheel equipped with two magnetic sensors, the magnet being positioned and having a power suitable for generating a magnetic field covering a zone through which the magnetic sensor passes as the wheel rotates.

The invention extends to a device for locating the wheel position on the right or on the left side of a vehicle, comprising, mounted on the wheel:
- two magnetic sensors having axes of maximum sensitivity lying in a plane that is intersecting to the axis of rotation of the wheel and which are offset from one another in this plane by a predetermined angle θ,
- means for measuring a signal at the terminals of each of the magnetic sensors, these means being able to deliver two periodic signals phase-shifted from one another by an angular value equal to (+ or −) θ, each representative of the variations in the values of the magnetic field as detected by the magnetic sensors during a revolution of the wheel, and
- a calculation unit programmed to determine, from the phase shift between the two periodic signals, the direction of rotation of the wheel and, from this direction of rotation and from the direction of travel of the vehicle, to deduce the wheel location on the right or on the left side of the vehicle.

Advantageously according to the invention, the two magnetic sensors are positioned in such a way that their axes of maximum sensitivity lie in a plane orthogonal to the axis of rotation of the wheel.

In addition, these two magnetic sensors are advantageously positioned in such a way that their axes of maximum sensitivity lie orthogonal to one another.

Furthermore, advantageously according to the invention, the measurement means comprise means for amplifying and means for shaping the amplified signal which are able to convert it into a periodic signal of squarewave form.

The location device according to the invention comprises, also advantageously, a magnet mounted fixedly on the vehicle with respect to each wheel equipped with two magnetic sensors, the magnet being positioned and having a power suitable for generating a magnetic field covering a zone through which the magnetic sensors pass as the wheel rotates.

Other characteristics, objects and advantages of the invention will become apparent from the detailed description which follows with reference to the attached drawings which by way of nonlimiting examples illustrate one preferred embodiment thereof.

BRIEF DESCRIPTION OF THE DRAWINGS

In these drawings:

FIG. 1 is a partial and schematic perspective view of a vehicle equipped with a location device according to the invention, FIG. 1a is a detailed diagram depicting the relative arrangement of the two magnetic sensors of the location device according to the invention, FIG. 2 is a functional block diagram of the processing electronics of this location device, and FIGS. 3a and 3b are two diagrams illustrating the principle of the location method employed according to the invention.

DESCRIPTION OF THE PREFERRED EMBODIMENTS

The location device according to the invention depicted by way of example in FIG. 1 is intended to locate the position of a wheel as being on the right or on the left side of a vehicle.

This location device is more specifically intended to be installed on vehicles equipped with a monitoring system comprising electronic units 1 mounted on each of the wheels 2 of the vehicles 3, incorporating sensors dedicated to measuring parameters such as the pressure and/or the temperature of the tires with which these wheels 2 are equipped, and intended to inform the driver of any abnormal variation in the parameter measured.

This location device firstly comprises two magnetic sensors 4, 5 designed to be able to be incorporated into the same electronic unit 1 and arranged in such a way that their respective axes of maximum sensitivity S4, S5 lie in the same plane perpendicular to the axis of rotation of the wheel 2 and are offset from one another by a predetermined angle θ=90°.

To this end, and according to the exemplary embodiment depicted in the figures, these two magnetic sensors 4, 5, on the one hand, are aligned along the same radial axis with respect with respect to the axis of rotation R of the wheel 2 and, on the other hand, consist in:
- a coil 4 comprising a soft iron core, positioned such that the longitudinal axis of the core, that forms the axis of maximum sensitivity S4 of the coil, coincides with an axis tangential to a circle centered on the axis of rotation R of the wheel 2,
- and a flat coil 5 formed of a flat winding positioned in such a way that the longitudinal axis of the winding that forms the axis of maximum sensitivity S5 of the coil, coincides with the aforementioned radial axis.

Positioned in this way, as the wheel 2 rotates, each of these coils 4, 5 exhibits, between its two terminals, a potential difference that varies according to a sinusoidal function with a period equal to the period of rotation of the wheel.

A magnetic sensor 4, 5 mounted on a wheel 2 of a vehicle 3 in effect detects the overall magnetic field obtaining around this sensor, this overall magnetic field being made up of the earth's magnetic field to which the environmental magnetic field that may in particular result from the presence of electrical or magnetic equipment on board the vehicle is added.

Now, as the wheel 2 rotates, this magnetic sensor 4, 5 moves in a circular path so that this sensor 4, 5 detects a variable magnetic field and the potential difference measured at the terminals of the sensor exhibits corresponding cyclic variations.

Furthermore, since according to the invention the two coils 4, 5 are positioned in such a way that their axes of maximum sensitivity S4, S5 are orthogonal, the signals representative of the potential difference at the terminals of the coils are phase shifted from one another by an angle equal to (+ or −) 90° so that, as depicted in FIGS. 3*a* and 3*b*, analyzing this phase shift makes it possible to determine the direction of rotation of the wheel 2.

With a view to measuring and processing the potential difference at the terminals of each coil 4, 5, the device according to the invention firstly comprises an amplification module 7 and a shaping module 8 incorporating a comparator, so that as the wheel 2 rotates:

the signal at the terminals of each coil 4, 5 is a sinusoidal signal of very low amplitude, the signal leaving the amplification module 7 is a sinusoidal signal with the same period as the previous signal but an amplitude greater than that of the signal, and the signal leaving the shaping module 8 is a square-wave signal of the same period as the sinusoidal signals.

The device according to the invention further comprises a calculation unit 9 to which the shaped signal is delivered and programmed to:

determine, as stated above, from analyzing the phase shift between the two sinusoidal signals, the direction of rotation of the wheel 2, and from this direction of rotation and from the direction of travel of the vehicle 3, determined elsewhere by any method known per se, deduce the wheel position, on the right or on the left side of the vehicle.

Lastly, and according to the invention, the vehicle 3 may also comprise, as depicted in FIG. 1, permanent magnets or electromagnetic magnets 10 fixed to the car body at the wheel arches 11 so that the magnetic field created by each of these magnets 10 is detected by the magnetic sensors 4, 5 mounted on the corresponding wheel 2, increasing the overall magnetic field detected by the sensors and therefore the amplitude of the sinusoidal signals leaving the amplification module 7.

The device according to the invention described hereinabove therefore, by incorporating two simple low-cost magnetic sensors 4, 5 into each electronic unit 1 on board a wheel 2 of a vehicle 3, makes it possible very quickly, after a few revolutions of the wheel 2, to locate the wheel position on the right or on the left side of the vehicle.

The invention claimed is:

1. A device for locating the position, on the right or on the left, of a wheel (2) of a vehicle (3), comprising:

two magnetic sensors (4, 5) having axes of maximum sensitivity (S4, S5) lying in a plane that is intersecting to the axis of rotation (R) of the wheel (2) and which axes are offset from one another in the intersecting plane by a predetermined angle θ, the two magnetic sensors mounted on said wheel and configured to detect and provide, at terminals of each of the sensors, a signal representative of variations in values of a magnetic field, means (7, 8) for measuring the signal at the terminals of each of the magnetic sensors (4, 5), the measuring means being able to deliver two periodic signals phase-shifted from one another by an angular value equal to (+ or −) θ, each of the two periodic signals representative of the variations in the values of the magnetic field as detected by said magnetic sensors during a revolution of the wheel (2), and a calculation unit (9) programmed to determine, from the phase shift between the two periodic signals, the direction of rotation of the wheel (2) and, from this direction of rotation and from the direction of travel of the vehicle (3), to deduce the location, on the right or on the left side of the vehicle, of the wheel (2).

2. The location device as claimed in claim 1, characterized in that the two magnetic sensors (4, 5) are positioned in such a way that the axes of maximum sensitivity (S4, S5) lie in a plane orthogonal to the axis of rotation (R) of the wheel (2).

3. The location device as claimed in claim 2, characterized in that the two magnetic sensors (4, 5) are positioned in such a way that the axes of maximum sensitivity (S4, S5) lie orthogonal to one another.

4. The location device as claimed in claim 2, further comprising a magnet (10) mounted fixedly on the body of the vehicle (3) and fixed with respect to the wheel (2) equipped with the two magnetic sensors (4, 5), said magnet being positioned and having a power suitable for generating a magnetic field covering a zone through which said magnetic sensors pass as said wheel rotates.

5. The location device as claimed in claim 3, further comprising a magnet (10) mounted fixedly on body of the vehicle (3) and fixed with respect to the wheel (2) equipped with the two magnetic sensors (4, 5), said magnet being positioned and having a power suitable for generating a magnetic field covering a zone through which said magnetic sensors pass as said wheel rotates.

6. The device as claim in claim 1, wherein, the two magnetic sensors (4, 5) are configured to detect and provide, at the terminals of each of the sensors, a signal representative of variations in values of the earth magnetic field.

7. The location device as claimed in claim 6, further comprising a magnet (10) mounted fixedly on the body of the vehicle (3) and fixed respect to the wheel (2) equipped with the two magnetic sensors (4, 5), said magnet being positioned and having a power suitable for generating a magnetic field covering a zone through which said magnetic sensors pass as said wheel rotates so that said sensor measures the magnetic field generated by said magnet in addition to measuring the earth magnetic field variations.

8. The location device as claimed in claim 1, wherein, the means for measuring is located on the wheel, a first of the two magnetic sensors comprises, mounted on the wheel, a coil (4) comprising a core that forms the axis of maximum sensitivity of the coil, each coil positioned such that a longitudinal axis of the core coincides with an axis tangential to a circle centered on the axis of rotation (R) of the wheel (2), and a second of the two magnetic sensors comprises, mounted on the wheel, a flat coil (5) formed of a flat winding that forms the axis of maximum sensitivity S5 of the coil, a longitudinal axis of the winding coincides with said radial axis.

9. The location device as claimed in claim 1, wherein, the means for measuring is located on the wheel, the two magnetic sensors (4, 5) are positioned in such a way that the axes of maximum sensitivity (S4, S5) lie in a plane orthogonal to the axis of rotation (R) of the wheel (2), the two magnetic sensors (4, 5) are aligned along a radial axis aligned with respect with respect to the axis of rotation (R) of the wheel (2), a first of the two magnetic sensors comprises, mounted on the wheel, a coil (4) comprising a core that forms the axis of maximum sensitivity of the coil, each coil positioned such that a longitudinal axis of the core coincides with an axis tangential to a circle centered on the axis of rotation (R) of the wheel (2), and a second of the two magnetic sensors comprises, mounted on the wheel, a flat coil (5) formed of a flat winding that forms the axis of maximum sensitivity of the coil, a longitudinal axis of the winding coincides with said radial axis.

10. The location device as claimed in claim 1, wherein, each of the two sensors comprises a coil mounted on the wheel, as the wheel (2) rotates, i) each of the coils exhibits, between the terminals of the coil, a potential difference that varies according to a sinusoidal function with a period equal to the period of rotation of the wheel, and ii) each of the coils moves in a circular path to detect a variable magnetic field and the potential difference measured at the terminals of the sensor exhibits corresponding cyclic variations.

11. The location device as claimed in claim 1, wherein, each of the two sensors comprises a coil mounted on the wheel, and the coils are mounted on the wheel so that axes of maximum sensitivity (S4, S5) of the coils are orthogonal.

12. The location device as claimed in claim 9, further comprising:

a magnet fixed to the car body so that a magnetic field created by said magnet is detected by each of the two magnetic sensors mounted on a corresponding wheel.

13. The location device as claimed in claim 10, further comprising:

a magnet fixed to the car body so that a magnetic field created by said magnet is detected by each of the two magnetic sensors mounted on a corresponding wheel.

14. The location device as claimed in claim 11, further comprising:

a magnet fixed to the car body so that a magnetic field created by said magnet is detected by each of the two magnetic sensors mounted on a corresponding wheel.

15. The location device as claimed in claim 9, wherein, there is no magnet fixed to the car body that creates a magnetic field detected by each of the two magnetic sensors mounted on a corresponding wheel.

16. The location device as claimed in claim 10, wherein, there is no magnet fixed to the car body that creates a magnetic field detected by each of the two magnetic sensors mounted on a corresponding wheel.

17. The location device as claimed in claim 11, wherein, there is no magnet fixed to the car body that creates a magnetic field detected by each of the two magnetic sensors mounted on a corresponding wheel.

* * * * *